2,822,377

PROCESS FOR THE PREPARATION OF N-SUBSTITUTED AMINOBUTYRIC ACID ESTERS FROM ACETOACETIC ESTER BY REDUCTIVE ALKYLATION

Wilhelm Jakob Kaiser, Dusseldorf-Holthausen, Germany, assignor to Henkel & Cie. G. m. b. H., Dusseldorf-Holthausen, Germany, a corporation of Germany No Drawing. Application October 14, 1955
Serial No. 540,641

Claims priority, application Germany October 20, 1954

7 Claims. (Cl. 260—468)

This invention relates to a process for the preparation of N-substituted aminobutyric acid esters, particularly of N-substituted $\beta$-aminobutyric acid alkyl esters from ethyl acetoacetate and primary amines.

The water-soluble salts of N-substituted $\beta$-aminobutyric acid, wherein the substituent radical at the nitrogen atom is an aliphatic, cycloaliphatic or aliphatic-aromatic group with more than six carbon atoms, are valuable industrial materials. For example, they have been found to be important coating agents for pigments, which are generally referred to as auxiliary flushing agents.

I have found that the corresponding N-substituted $\beta$-aminobutyric acid esters, which may readily be transformed into the water-soluble salts by well-known methods, can be produced with good yields by reacting ethyl acetoacetate with an aliphatic, cycloaliphatic or aliphatic-aromatic primary amine having more than six carbon atoms in the molecule, and then hydrogenating the reaction product.

Primary amines with more than six carbon atoms in the molecule which are suitable for the reaction with ethyl acetoacetate according to the present invention are, for example, aliphatic amines such as heptylamine, octylamine, decylamine, dodecylamine or octadecylamine with straight or branched carbon chains; also alkyl-substituted cyclohexyl amines such as methyl-4-aminocyclohexane, ethyl-4-aminocyclohexane, 3-methyl-4-isooctyl-4-aminocyclohexane and similar compounds. Other primary amines which are suitable for the above reaction include aliphatic-aromatic amines such as methylaniline, ethylaniline, hexylaniline, decylaniline, dodecylaniline, xylidines, and aliphatic amines of the type described above wherein at least one of the hydrogen atoms on the carbon chain is substituted by a phenyl radical, such as 1-phenyl-2-aminoethane, 1-phenyl-3-aminobutane, and 1,1'-diphenyl-3-aminopropane.

The reaction between the ethyl acetoacetate and the primary amine may be carried out in the absence or in the presence of inert solvents. Suitable solvents are, for example, Decalin, gasoline, benzene, toluene or chlorobenzene.

In order to bring about the reaction between the primary amine and the ethyl acetoacetate, the reactants are admixed with each other in any desired sequence or fashion. For example, the primary amine may be slowly added to the ethyl acetoacetate or vice versa, either in the presence of an inert solvent or without the aid of a solvent. However, the entire amount of one reactant may also be added all at once to the entire amount of the other reactant, either in the presence or absence of an inert solvent.

It is preferred to provide an excess of ethyl acetoacetate in the reaction mixture.

A certain amount of heat is developed upon admixture of the reactants; this heat energy is sufficient to maintain the reaction mixture at a temperature most favorable for the reaction, so that no outside source of heat need be supplied.

The water split off during the reaction is continuously or periodically removed from the reaction mixture by any suitable method, for example by distilling in vacuo at moderate temperatures. In order to allow the reaction to go to completion, the reaction mixture is allowed to stand at elevated temperatures. Upon completion of the reaction the unreacted excess of ethyl acetoacetate and, if necessary, the solvent, are distilled off. The resulting distillate can be used to react with more primary amine, after the required amount of ethyl acetoacetate has been added to provide an excess for the subsequent reaction batch.

The reaction product, i. e. the distillation residue, is then dissolved in an inert solvent such as Decalin (decahydronaphthalene) and hydrogenated in the presence of a hydrogenation catalyst and, if desired, at elevated pressure and at temperatures between 120 and 160° C., for example. The use of metallic nickel as the hydrogenation catalyst has proved to be particularly advantageous. The hydrogenation may be carried out by any of the known methods, for example by adding the hydrogenation catalyst directly to the solution of the material which is to be hydrogenated and the solvent or vice versa by introducing this solution into an autoclave already containing the hydrogenation catalyst. It is also possible to add the catalyst suspended in a solvent. The autoclave is then closed, hydrogen is introduced and heat applied so as to maintain the desired temperature (about 120–160° C.) and the desired internal pressure (about 30–70 atmospheres gauge). The reaction has gone to completion when no more hydrogen is consumed which is shown by the fact that the internal pressure remains constant at a given temperature. The hydrogenation product, an N-substituted $\beta$-aminobutyric acid ester, may then be purified by filtering off the catalyst and removing the solvent by distillation in vacuo. The purified ester can thereafter be transformed into the corresponding soluble salt by saponification with an alkali metal hydroxide, or transformed into the corresponding free aminoacid by boiling with water.

The hydrogenated products obtained by the process according to the present invention, particularly the alkali metal salts, are useful not only for the purpose above indicated, but also as wetting agents, emulsifying agents and dispersing agents. Furthermore, the alkali metal salts of the N-substituted $\beta$-aminobutyric acid esters are useful as foam stabilizers.

The following examples will further illustrate my invention and enable others skilled in the art to understand it more completely. It is understood, however, that I do not intend to limit the invention to these specific examples.

Example I 185 parts by weight of molten dodecylamine were slowly added to a mixture of 260 parts by weight ethyl acetoacetate and 240 parts by weight Decalin, accompanied by stirring. A homogeneous solution was formed and a moderate amount of heat was given off. The solution soon turned cloudy due to the formation of water. The reaction mixture was maintained at 60° C. for a few hours to allow the reaction to go to completion. Thereafter, the water formed was drained off and the remainder of the reaction mass was distilled in vacuo to remove the Decalin and the excess ethyl acetoacetate. The distillation residue, amounting to 303 parts by weight, was re-dissolved in 300 parts by weight Decalin and hydrogenated with hydrogen in the presence of metallic nickel as a catalyst. For this purpose the Decalin solution was introduced into an autoclave containing the metallic nickel catalyst. The autoclave was then closed, hydrogen was introduced and heat applied so as to maintain a temperature of 140° C. and an internal pressure of about 40 atmospheres gauge. After about 150 minutes the contents were removed from the autoclave, filtered to remove the catalyst and the filtrate was distilled in vacuo to remove the Decalin. The distillation residue was a viscous oil which was found to be dedecyl-β-aminobutyric acid ethyl ester. The yield was 266 parts by weight, which is 90% of the theoretical yield. Saponification of the hydrogenated product with dilute sodium hydroxide yielded a clear, foaming solution of the sodium salt of the corresponding aminoacid.

*Example II*

213 parts by weight of molten coconut fat amine were slowly added to a mixture of 192 parts by weight ethyl acetoacetate and 200 parts by weight Decalin, accompanied by stirring. After all of the amine had been added, the reaction mixture was allowed to stand for 15 hours at a temperature of 50–60° C. until the reaction had gone to completion. The water formed by the reaction was continuously drained off. The excess ethyl acetoacetate and the solvent were then separated from the reaction product by distillation in vacuo. After adding to the distillate the amount of ethyl acetoacetate used up the reaction, it was used as one reactant in the next batch. The distillation residue was again dissolved in Decalin and hydrogenated in the presence of metallic nickel as a catalyst. For this purpose the Decalin solution was introduced into an autoclave containing the metallic nickel catalyst, hydrogen was introduced under pressure and heat applied so as to maintain the temperature at about 125° C. and the internal pressure at 60 atmospheres gauge. After about 180 minutes the contents were removed from the autoclave, filtered to remove the catalyst and the filtrate was distilled in vacuo to remove the solvent. The distillation residue was a viscous oil which was identified as coconut fat β-aminobutyric acid ethyl ester. The yield was 310 parts by weight, which is 94% of the theoretical yield. An aqueous, foaming solution of the corresponding sodium salt was formed by saponifying the distillation residue with dilute sodium hydroxide.

*Example III*

135 parts by weight of molten hexadecylamine were added very slowly to a mixture of 130 parts by weight ethyl acetoacetate and 130 parts by weight gasoline (B. P.=85–100° C.), accompanied by stirring. Thereafter, the reaction mixture was allowed to stand, the water was removed and the reaction product was hydrogenated in the presence of a nickel catalyst, as described in Example I, except that the hydrogenation was carried out at 160° C. and 25 atmospheres gauge. After filtering the hydrogenated product and distilling the filtrate to remove the catalyst and the solvent, as in the previous examples, a viscous oil was obtained, which was identified to be hexadecyl-β-aminobutyric acid ethyl ester. The yield was 191 parts by weight, which corresponds to 95% of the theoretical yield. The corresponding sodium salt was obtained by saponifying the ethyl ester with dilute sodium hydroxide. The sodium salt was relatively insoluble in water at 20° C., but readily soluble in water at higher temperatures.

*Example IV*

94 parts by weight of 1-ethyl-4-amino-cyclohexane were slowly added to a mixture of 195 parts by weight decahydronaphthalene and 195 parts by weight ethyl acetoacetate. The temperature of the mixture rose without applying external heat, and the resulting solution soon clouded up due to the formation of water. After allowing the reaction mixture to stand for about 15 hours, the reaction product was separated, hydrogenated and purified, as described in Example II. The hydrogenation product was identified to be p-ethylcyclohexyl-β-amino- butyric acid ethyl ester, a colorless oil. The yield was 148 parts by weight, which corresponds to 82% of the theoretical yield. The ethyl ester was then boiled for about 40 minutes with 700 parts by weight of a 5% aqueous solution of sodium hydroxide, whereby a clear solution of the corresponding sodium salt was formed. To this solution, an about 18% hydrochloric acid solution was added, while cooling, until the solution reacted acid to Congo red. The chlorohydrate of the aminoacid precipitated out was filtered off by suction and finally dried at room temperature.

*Example V*

550 parts by weight of molten dodecylaniline were slowly added to 369 parts by weight of ethyl acetoacetate. The reaction mixture warmed up due to the evolution of heat of reaction. It was allowed to stand for several hours at 50° C. and thereafter distilled in vacuo to remove the water split off during the reaction. The excess ethyl acetoacetate was then distilled, the distillation residue was dissolved in Decalin, hydrogenated in the presence of metallic nickel as a catalyst at 120° C. and 45 atmospheres gauge and worked up as described in the preceding examples. The hydrogenated product was identified to be dodecylphenyl-β-aminobutyric acid ethyl ester. The yield was 690 parts by weight, which corresponds to 93% of the theoretical yield.

While I have described certain specific embodiments of the present invention, it will be obvious to persons skilled in the art that various changes and modifications can be made without departing from the spirit of the invention or the scope of the appended claims.

I claim:

1. The process of producing N-substituted β-aminobutyric acid ethyl esters, which comprises reacting ethyl acetoacetate with an amino compound selected from the group consisting of primary alkylamines, C-alkyl-amino-cyclohexanes and C-alkylanilines with more than six carbon atoms in the molecule at a temperature between substantially room temperature and about 60° C., and hydrogenating the reaction product at a temperature from 120 to 160° C. and a pressure from 40 to 60 atmospheres gauge in the presence of metallic nickel as a catalyst.

2. The process of producing N-substituted β-aminobutyric acid ethyl esters, which comprises admixing an amino compound selected from the group consisting of primary alkylamines, C-alkyl-amino-cyclohexanes and C-alkylanilines having more than six carbon atoms in the molecule with more than an equivalent amount of ethyl acetoacetate, allowing the mixture to stand for an extended period of time at a temperature between substantially room temperature and about 60° C., removing the water formed thereby, and hydrogenating the remaining mass at a temperature from 120 to 160° C. and a pressure from 40 to 60 atmospheres gauge in the presence of metallic nickel as a catalyst.

3. The process of producing dodecyl-β-aminobutyric acid ethyl ester, which comprises reacting ethyl acetoacetate with dodecylamine at a temperature between substantially room temperature and about 60° C., and hydrogenating the reaction product at a temperature of about 140° C. and a pressure of about 40 atmospheres in the presence of metallic nickel as a catalyst.

4. The process of producing coconut fat-β-aminobutyric acid ethyl ester, which comprises reacting ethyl acetoacetate with coconut fat amine at a temperature between 50 and 60° C., and hydrogenating the reaction product at a temperature of about 125° C. and a pressure of about 60 atmospheres in the presence of metallic nickel as a catalyst.

5. The process of producing hexadecyl-β-aminobutyric acid ethyl ester, which comprises reacting ethyl acetoacetate with hexadecylamine at substantially room temperature, and hydrogenating the reaction product at a temperature of about 160° C. and a pressure of about 25 atmospheres in the presence of metallic nickel as a catalyst.

6. The process of producing p-ethylcyclohexyl-β-aminobutyric acid ethyl ester, which comprises reacting 1-ethyl-4-aminocyclohexane with ethyl acetoacetate at substantially room temperature, and hydrogenating the reaction product at a temperature of about 160° C. and a pressure of about 25 atmospheres in the presence of metallic nickel as a catalyst.

7. The process of producing dodecylphenyl-β-aminobutyric acid ethyl ester which comprises reacting ethyl acetoacetate with dodecylaniline at a temperature of about 50° C., and hydrogenating the reaction product at a temperature of about 120° C. and a pressure of about 45 atmospheres in the presence of metallic nickel as a catalyst.

References Cited in the file of this patent
UNITED STATES PATENTS 2,577,900     Lisk et al. _____ Dec. 11, 1951

OTHER REFERENCES

"Organic Reactions," vol. IV, pp. 181–3, 191, 196–9, 232–3, 235, Adams, ed., J. Wiley & Co. (1948).